April 23, 1968   J. R. BASKETT   3,380,011
ADJUSTABLE RESISTOR
Filed April 6, 1967   2 Sheets-Sheet 1
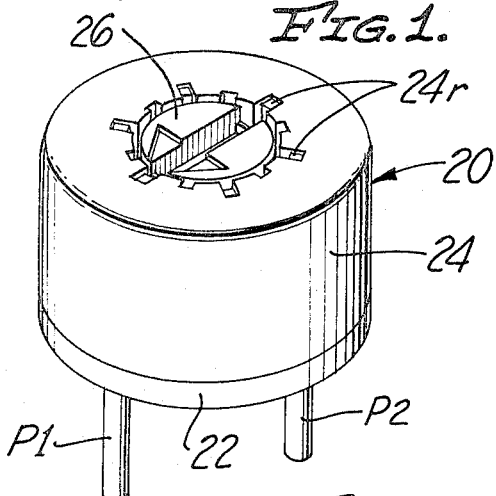
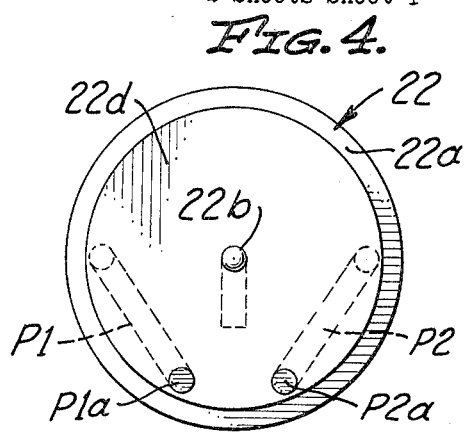
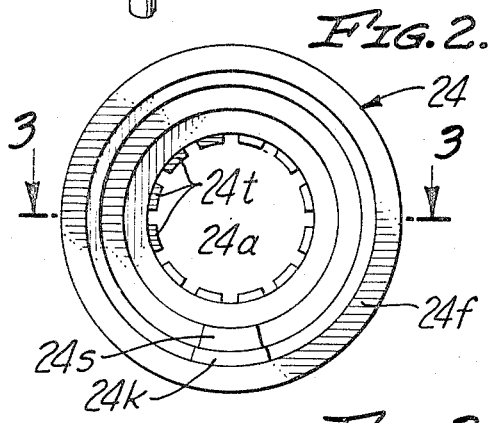
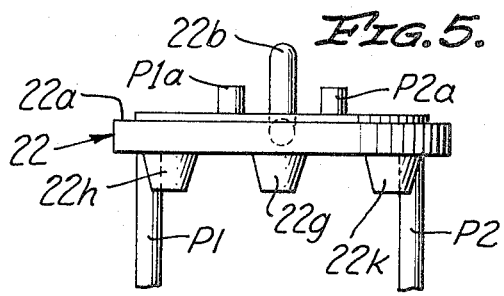
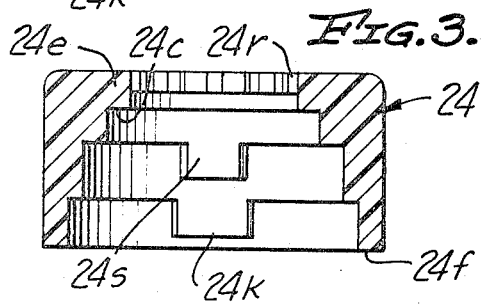
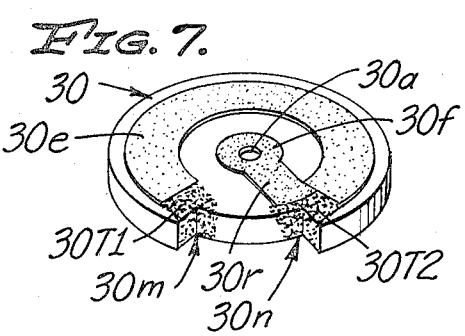
INVENTOR
JOHN R. BASKETT
BY

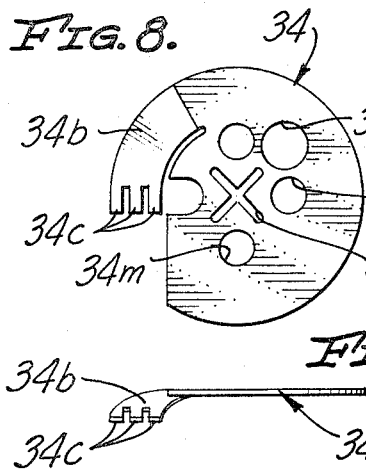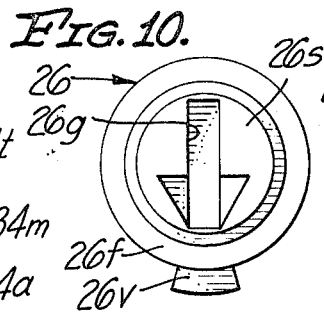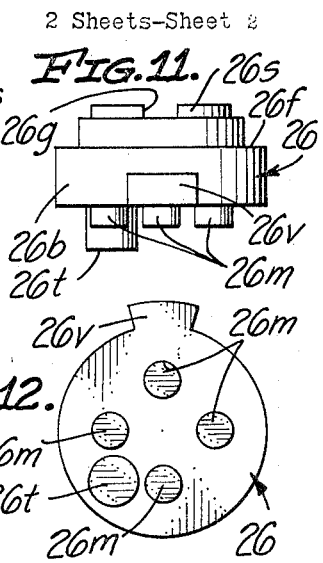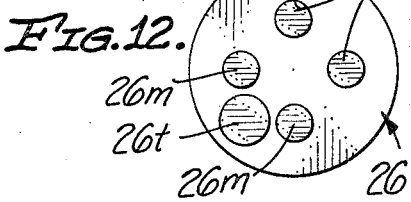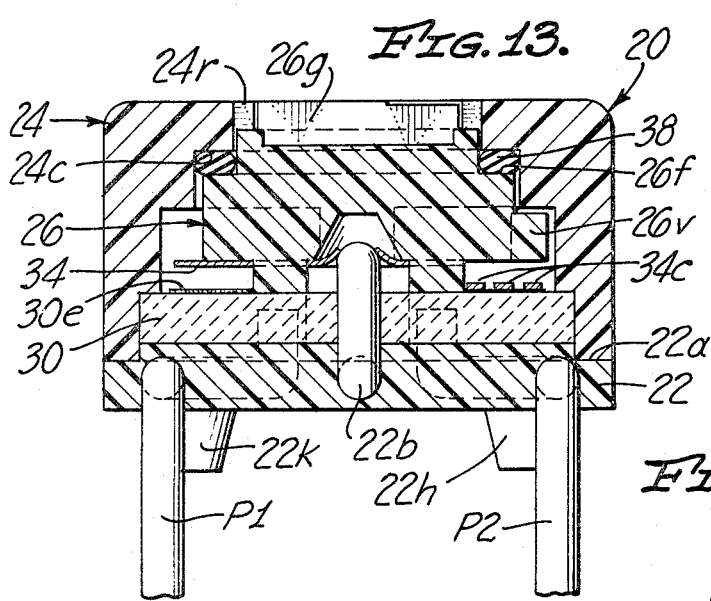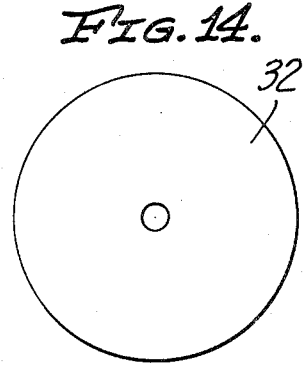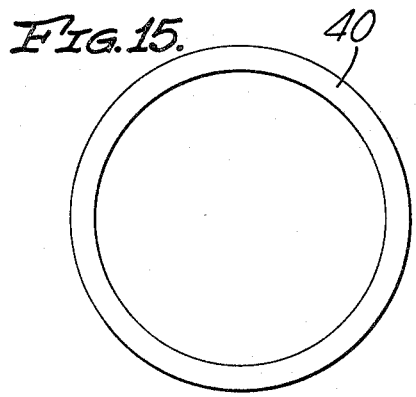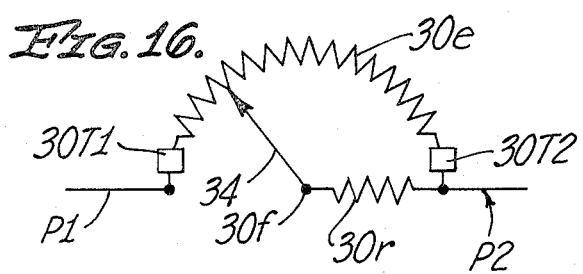

United States Patent Office 3,380,011
Patented Apr. 23, 1968

3,380,011
ADJUSTABLE RESISTOR
John R. Baskett, Riverside, Calif., assignor to Bourns, Inc., a corporation of California
Filed Apr. 6, 1967, Ser. No. 628,890
9 Claims. (Cl. 338—162)

ABSTRACT OF THE DISCLOSURE

A resistor structure characterized by being adjustable, adapted to be plugged into apertures in an electronic circuit board, capable of being very accurately and permanently set at a particular desired resistance value while incorporated in an electronic circuit, proof against catastrophic failure by contact burn-out, inexpensive to manufacture and hence expendable, proof against malfunction during setting or adjustment, and adapted for semi-automatic assembly, further characterized by having a contact movable along a resistive element during adjustment of the resistance value of the resistor but so arranged that only a portion of the electric current carried by the resistor courses through the contact, the remainder of the current passing through a resistive element, and characterized by ability to incorporate a measure of correction of temperature coefficient of resistivity.

---

In the prior art a large variety of fixed and adjustable resistors is available for use. In general, fixed resistors are of both molded and of wire wound construction, and have either wire (pig-tail) or clip-engaged terminals at opposite ends. In general, adjustable resistors are relatively large and are formed on tubular bases and comprise an encircling conductive band with a clamping device such as a screw whereby the band may be slid longitudinally along the resistive element and clamped in a desired location to provide the requisite value of resistance between the band and a fixed terminal at the end of the base. Such adjustable resistors have in common some undesirable characteristics. For example, if the movable contact burns out or contact failure occurs, the resistor creates an open-circuit condition, which in many instances results in catastrophic failure of appurtenant apparatus. Also, adjustability of the resistor to obtain precisely a specific value of resistance is difficult and sometimes impossible, due to the step-wise variation of resistance as the contact is moved. Further, in those situations in which adjustment must be effected while the resistor is active in a circuit, stops or equivalent means are required so that the movable contact cannot be moved off the end of the resistor and thus create an open-circuit condition, or to prevent the value of the resistor from being decreased below a specified lower permissible limit. Additionally, since the movable contact must carry the entire resistor current, it is especially susceptible to damage. Further, there is generally lacking any means for compensation for + or − temperature coefficient, and none of the resistors is adapted for direct use on electronic circuit boards.

The resistor of the present invention, which is hereinafter described in detail, avoids all of the noted disadvantages. It is so constructed that only part of the resistor current is conducted through the contact, whereby when the contact fails there is not created an open-circuit condition. Further, contact resistance variation which may occur during adjustment of the resistor is damped or subdued, and resolution is unexcelled. In the presently explained resistor, no stops are required to prevent the movable contact from creating an open-circuit or reducing the effective value of the resistor below the desired minimum value, which latter value may nevertheless be a value considerably above zero.

The noted features and characteristics of the adjustable resistor are attained in a very small device of the order of one-fourth inch diameter and three-sixteenths inch high (exclusive of the terminal pins or leads) by simple and inexpensive means, whereby the resistor can be grouped with ordinary expendable fixed-value resistors of the "pig-tail" type, but is characterized by being capable of being adjusted over a wide range of values to an exact resistance value rather than having a plus and minus tolerance. Additionally, the adjustable resistor according to the invention is so constructed as to permit direct plugging-in on electronic circuit boards and thus is such as to facilitate electrical connection with other circuit means.

Briefly, the adjustable resistor in preferred form comprises a disc-like ceramic device or substrate on which are supported an arcuate film-like resistive structure and an auxiliary thin resistive structure, the arcuate structure or film extending between the resistor terminals and the auxiliary resistive film structure extending between one of the resistor terminals and an adjustable contact which is adjusted to a desired point along the arcuate structure. Thus the auxiliary resistive structure is disposed so as to be electrically in parallel with the portion of the arcuate principal resistive structure that is at any time electrically interposed between the adjustable contact and one of the resistor terminals, whereby open-circuit due to contact failure is avoided and a maximum value of resistance is inserted in the circuit if a contact fails. Further, since the temperature coefficients ($Tc$) of the two resistive devices may be of opposite sign, a measure of correction for temperature coefficient of resistivity may be attained by using materials having opposite signs of $Tc$. The ceramic device or substrate is affixed to an insulative disc-like base device through which the terminal members extend and which base device forms part of the resistor housing or casing. A cup-like second housing device is adapted to be inverted over and sealed to the base device, and to enclose and retain in operative position a rotor device. The rotor device includes an insulative button or actuator having a portion disposed in an opening in the second housing device, and on which button a contact device is affixed for rotary adjustment movements therewith, the contact device comprising a contact which may be moved along an exposed zone of the arcuate film-like principal resistive structure to a desired contact position thereon. As an aid in retaining the rotor in position, a pin is affixed in the base device and/or the ceramic device, axially coincident with the rotor device, and the contact device is arranged to engage and be positioned by the pin. The latter conveniently also serves as a conductive element interconnecting the contact device with a terminal of the auxiliary resistive device.

The exposed button or actuator member of the rotor device is arranged with one or more recesses arranged below the top surface of the cup-like second housing member or "cover" and arranged to communicate with one or more cooperating recesses formed in the said top surface, whereby, following plugging-in and adjustment of the resistor to the exact resistance value desired, the rotor device may be permanently locked to the housing cover by self-setting adhesive applied in the communicating recesses and therein cured.

The cup-like second housing device or cover is secured to the base device by interposing therebetween a thermo-active material of the character of a "pre-form," and activating the material in place to bond the two housing members together with the other components of the resistor assembled therein. Similarly, the ceramic device or member may be secured to the base device using a heat-activated pre-form of sheet-like character interposed between the two devices and there subjected to heat and and force.

The preceding brief general description makes it evident that it is a principal object of the invention to provide general improvements in small adjustable resistors.

Another object of the invention is to provide a small adjustable resistor that is relatively immune to open-circuit due to adjustable-contact failure.

Another object of the invention is to provide a single construction of very small resistor which may be used in place of any of a large family of fixed resistors of various resistance values and having the advantages that only one value of resistor need be stocked to cover a wide range of resistor values and also that in each case the exact resistor value desired is available by adjustment of the novel small resistor.

Another object of the invention is to provide a miniature adjustable resistor incorporating means for obtaining temperature coefficient of resistivity correction.

Another object of the invention is to provide an adjustable resistor adapted for use with perforated circuit boards and for adjustment after electrical incorporation into a circuit and subsequent permanent locking in adjusted relationship to the circuit.

Other objects and advantages of the invention will hereinafter be made evident or set out in the appended claims and following description of a preferred exemplary physical embodiment of the invention, the description having reference to the accompanying drawings which are a part of this specification.

In the drawings:

FIGURE 1 is a pictorial view of the exemplary adjustable resistor, prior to application of locking material, the drawing being to no particular scale but depicting the resistor grossly enlarged;

FIGURE 2 is a plan view of a cover member of the housing of the exemplary resistor shown in FIGURE 1, inverted;

FIGURE 3 is a sectional view of structure shown in FIGURE 2, taken as indicated by broken director lines 3—3 of FIGURE 2;

FIGURE 4 is a top plan view of a base structure comprised in the resistor depicted in FIGURE 1;

FIGURE 5 is a view in elevation of the base structure shown in FIGURE 4;

FIGURE 6 is a bottom view of the base structure shown in FIGURES 4 and 5;

FIGURE 7 is a pictorial view of a ceramic substrate with applied conductive and resistive means, comprised in the resistor depicted in FIGURE 1;

FIGURE 8 is a pictorial view of a contact device comprised in the exemplary resistor;

FIGURE 9 is a view in elevation of the contact device shown in FIGURE 8;

FIGURE 10 is a top plan view of a rotor member comprised in the exemplary resistor;

FIGURE 11 is a view in elevation of the rotor member shown in FIGURE 10;

FIGURE 12 is a bottom plan view of the rotor member shown in FIGURE 10;

FIGURE 13 is a transverse sectional view of the resistor shown in FIGURE 1 but drawn to a different scale;

FIGURES 14 and 15 are plan views of heat-activated pre-form components used in making the exemplary resistor; and FIGURE 16 is a schematic circuit diagram of the resistor.

Referring now to FIGURES 1–6 of the drawings, the illustrative resistor, 20, comprises a base device 22 and a cover member 24 which coperate to form a housing or casing in which operating components are housed, and further comprises a rotor device 26, the upper generally circular end portion of which is disposed in a generally circular but serrate-edge aperture provided in the cover member 24. The base device, which preferably is formed of molded compound or composition such as a synthetic resin, further comprises first and second terminal pins P1 and P2. As illustrated in FIGURES 2 and 3, cover member 24 is of generally cylindrical or cup-like exterior configuration, has an end wall 24e in which an aperture 24a is provided, and has at its lower terminus an annular face 24f. The aperture 24a is provided with a serrated periphery formed by tooth-like portions 24t, and the upper surface of wall 24e is formed with recesses such as 24r (FIGURE 1) adjacent to the serrated edge. Additionally, the stepped interior wall of cover member 24 is provided with a protruding key 24k and a stop 24s, the purposes of which will presently be made more evident.

The base device 22 (FIGURES 4, 5 and 6) is of molded material and comprises principally a disc 22d provided with an annular surface 22a that is formed to be complementary to face 24f of the housing cover member, whereby the two may be adhesively bonded or fused ultrasonically to unite the principal housing members into an integral unit. The base device further comprises, molded therein, portions of the metallic terminal members or pins P1 and P2, and the lower end of a conductive stub 22b. The pins P1 and P2 have intermediate portions embedded in the disc 22d, and upwardly-protruding short ends or stubs P1a, P2a, in addition to the longer downwardly extending portions which serve as plug-in terminals of the resistor. Further the base disc 22d is provided with short downwardly-extending "stand-off" feet 22g, 22h and 22k to permit the resistor to be spaced from a circuit board into which it may be plugged and thus accommodate mis-match or misalignment of the terminals and board apertures and to improve heat-dissipation.

Disposed on disc 22d of the base device is an insulative ceramic substrate 30 (FIGURES 7 and 13) whose metal-coated central aperture 30a is dimensioned to receive stub 22b of the base device with a close fit. The substrate 30 has deposited thereon adherent conductive termination films 30T1 and 30T2, a small portion of each of which is overlain by respective end portions of an adherent arcuate primary resistive device or element 30e (preferably of cermet or of alloy) and one of which (30T2) is overlain in part by an end portion of an auxiliary resistive device 30r, the arrangement being such that films 30T1 and 30T2 provide terminal connectors for the ends of element 30e and the outer end of device 30r. The latter resistive device is of cermet or deposited-film form and thus may be of material having a temperature coefficient or resistivity of sign opposite to that of element 30e. Further, auxiliary resistive device 30r has its inner end overlying and in electrical connection with an adherent metallic or conductive film 30f which encircles and covers the interior of bore or aperture 30a.

The substrate 30 is assembled onto base device 22 with stub 22b fitting in and protruding above aperture 30a, and with terminal pin ends P1a and P1b fitting closely into respective ones of corners 30m and 30n of a notch formed in the substrate. The metal films 30T1 and 30T2 are so applied as to extend over the noted inside corners as indicated in FIGURE 7. The substrate is adhesively bonded to base device 22 by application of an apertured pre-form or disc 32 (FIGURE 14) of heat-activated material such as thermoplastic resin between the two members, followed by application of heat and clamping forces. Subsequent to setting of the adhesive, enhancement of the electrical connection of the element 30e to the terminal pins, and of the film 30f to stub 22b, is effected by soldering, application of conductive cement, or the like.

To permit the value of electrical resistance exhibited between terminal pins P1 and P2 to be adjusted, a movable contact device 34 (FIGURES 8 and 9) is employed to form an electrical connection between stub 22b and a selected point on element 30e. The contact device 34 is of resilient sheet material and is provided with a central aperture 34a of cruciform or other multi-lobed configuration for resilient mechanical and electrical coaction with stub 22b as indicated in FIGURE 13, and is further provided with a downwardly-extending resilient contact arm 34b terminating in one or more contacts such as 34c which are arranged and disposed to press against element 30e. The contact device 34 is secured to the rotor body 26b (FIGURE 11) in flat face-to-face contact with the bottom face of the latter body, by means of an integral protrusion or tit 26t (FIGURES 11 and 12) which extends through a complementary aperture 34t (FIGURE 8) in the contact device and is peened or flattened over the adjacent face of the contact device to retain the latter in assembled relationship to body 26b. So that the point on element 30e at which connection is made by contacts 34c may be selected, the contact device is secured to rotor body 26b as noted and the latter is made to be rotatable by external means such as a driver. Thus body 26b is provided with a plurality of downwardly extending projections or lugs 26m (FIGURES 11 and 12) each of which is tightly received in a respective one of a plurality of complementary apertures 34m (FIGURE 8) which thus provide effective driving engagement between body 26b and contact device 34. Thus integrated, the contact device 34 and body 26b form a complete rotor device which is initially rotatable in the casing of the resistor device to permit electrical adjustment of the resistance value.

Rotor member 26 is formed with an annular upper step surface or face 26f which encircles the stub portion 26s (FIGURES 10 and 11) that is disposed in the serrate aperture in the upper wall 24e of cover member 24 of the resistor housing. Thus, with contact device 34 secured to the rotor body and with stub portion 26s in the noted aperture and with stub 22b (FIGURE 5) entered or pressing into the cruciform central aperture of the contact device 34, there is defined an axis of rotation of the rotor structure or device. The rotor device is provided with a transverse dual-purpose slot 26g across the stub portion 26s, and preferably the slot is made shallower at end portions and deeper therebetween, as indicated, the deeper portion being dimensioned to receive an instrument screwdriver or blade for facilitating rotation of the rotor. Further, the rotor body 26b is preferably formed with a projecting stop 26v that is dimensioned and disposed, relative to other portions of the rotor device, to coact with stop abutment 24s (FIGURE 2) of the cover, whereby to limit contacts 34c to positioning movement along an exposed portion of element 30e between the terminal ends of the latter.

During assembly of the housing cover member 24 onto the rotor device and onto base device 22, an O-ring 38 (FIGURE 13) is applied to surface 26f of the rotor device, preferably also a heat-sensitive adhesive pre-form 40 (FIGURE 15) is applied to annular surface 22a of the base device, and key 24k of the cover is brought down between and in mutual engagement or positioning relationship with terminal stubs P1a and P2a. The two body members are then bonded together, as by activating the preform 40, or by ultrasonic peripheral bonding along the contacting faces 22a–24f of the two body members. The O-ring 38 serves to seal the interior of the resistor device against ingress of foreign material and absorbs dimensional differences due to manufacturing tolerances in the parts of the resistor device. As is evident, the O-ring is disposed between the ceiling surface 24c (FIGURE 3) and the annular surface 26f (FIGURE 11) of the rotor device. The rotor device may be maintained in spaced relationship relative to the surface of substrate 30 by the effect of one or more of stubs 26m (FIGURE 11) reposing on the substrate, as is more fully explained in applicant's co-pending application, Serial No. 628,889, filed of even date herewith.

Subsequent to manufacture and sealing of the resistor device of the invention, and following plugging-in and terminal-connection of the resistor in an electronic circuit, the resistance exhibited between terminals P1 and P2 is adjusted to the precise value required in the circuit, by manual manipulation of the rotor device with the aid of a driver tool inserted in slot 26g. Since even extremely small resistance value changes may be made due to the nature of the element 30e and its parallel-connected auxiliary 30m, very precise adjustment is possible. That is made evident by consideration being given to FIGURE 16. Once the resistor has been thus adjusted, the adjustment is made permanent by application of self-curing adherent cement, such as self-polymerizing hardening adhesive synthetic resin, to the cavities formed on the upper surface of the resistor device by recesses 24r and the transverse slot 26g, and permitting the cement to set or harden.

It is evident from consideration of the preceding description of a preferred exemplary resistor according to the invention that there has been provided a high-quality expendable substitute for families of conventional resistors which are of fixed resistance values and are all characterized by fairly wide resistance-value tolerances of, for example, plus or minus 1%. In contrast, a series or group of like resistors according to the present invention can readily be constructed so that an entire range of resistance values is accommodated by any of the resistors with the same tolerance applicable to the resistance range, and any of the like resistors can be used in lieu of any of a large family of different fixed-value resistors, whereby only a comparatively small stock of resistors is necessary to cover the entire range of values; and with the distinct and very valuable additional advantage that the precise resistance value needed and desired in the particular circuit can be obtained by adjusting the plugged-in resistor that is selected at random from among the group of like resistors made in accord with the invention. As is evident, incorporation of the parallel-connected resistive device 30r in the resistor not only avoids all possibility of an open-circuit due to contact burn-out, but provides the meritorious additional advantage of greatly augmenting the precision and ease of the adjustment to the value required in the circuit by making the resistance change gradual as the contacts are moved. The diagram of FIGURE 16 diagrammatically depicts the electrical arrangement of the several enumerated electrically active components of the resistor.

Since the resistive structures 30e and 30r are susceptible of concurrent application by automatic machinery, and since all of the parts may be of very small dimensions as hereinbefore indicated, the resistor is inexpensive. Further, due to the noted characteristics, it is much more than merely an acceptable substitute for the commonly-used fixed-value resistors ordinarily used in modern electronic circiuts. Accordingly and as indicated, all of the noted objectives of the invention are attained. In the light of the disclosure, it is evident that changes will occur to others skilled in the art and accordingly it is not desired to restrict the invention to the particular illustrated details of the exemplary resistor except as is required by the appended claims.

I claim:

1. A very small adjustable resistor adapted to be plugged into apertures of an electronic circuit board, said resistor comprising:

housing means, including means forming a substantially closed chamber;

a substrate disposed in the lower portion of said chamber and an arcuate principal resistive device disposed on said substrate and partially encircling a generally circular surface area of the substrate;

rotatable means, including a rotor member guided by said housing means for rotation, said rotatable means comprising a contact device carried by said rotor member for movement therewith and having a contac movable along said principal resistive device from end to end thereof;

terminal means, including first and second terminal devices having respective pins extending outwardly from said housing and having inner ends electrically connected to respective ends of said principal resistive device;

an auxiliary resistive device disposed on said substrate and having first and second electrical ends and having the first end thereof connected to an end of said principal resistive device; and connecting means electrically connecting said contact device to the second electrical end of said auxiliary resistive device, whereby the value of resistance exhibited between said terminal members may be adjusted by movement of said contact along said principal resistive device and whereby open-circuit between said terminal members incident to failure of said contact is avoided.

2. An adjustable resistor according to claim 1, in which said housing means comprises a circular insulation base portion in which offset portions of said terminal members generally perpendicular to the outwardly extending pins are embedded in said base portion and said pins are spaced and arranged for plugging into an apertured electronic circuit board, whereby the attachment of said terminal members to said base is reinforced against dislodgement from said base incident to plugging in and removal from such circuit board.

3. An adjustable resistor according to claim 1, in which the temperature coefficient of resistivity of said auxiliary resistive device is of algebraic sign opposite that of said principal resistive device.

4. An adjustable resistor according to claim 1, wherein the total resistance of said auxiliary resistive device is less than the total resistance of said principal resistive device, whereby adjustment of resistance value exhibited between said terminals incident to rotation of said rotatable means is gradual and characterized by very fine resolution and may be effected over the resistance range between a low value equal to the value of both said resistive devices connected in parallel and a high value equal to the total resistance value of said principal resistive device.

5. An adjustable resistor according to claim 1, in which said substrate is a flat generally round ceramic plate having an arcuate notch in the margin thereof, and first and second conductive coatings at respective ends of said notch interconnecting respective ones of the inner ends of said terminal means to respective ends of said principal resistive device.

6. An adjustable resistor according to claim 5, in which said housing means comprises an internal key reposing between said inner ends of said terminal means and positioned thereby, said housing means further comprising a stop abutment therein, and said rotatable means comprising a stop rotatable along a path interrupted by said stop abutment, said stop and stop abutment being so disposed relative to said contact and said principal resistive device that angular rotation of said rotatable means in said housing means is restricted to an arc substantially equal to the angular measure of the arc covered by said principal resistive device, whereby rotary movement of said contact is restricted to movement in contact with said principal resistive device.

7. An adjustable resistor according to claim 1, in which said housing means and said rotor member comprise at outwardly exposed surfaces thereof respective recesses at least two of which are at least partially aligned so as to at least partially communicate with each other at any rotational position of the rotor member relative to the housing, whereby subsequent to adjustment of the resistor hardenable adherent plastic material may be pressed into the communicating recesses and hardened to lock the rotor member to the housing means.

8. An adjustable resistor according to claim 1, in which said housing means includes a round flat base in which offset portions of said terminal pins are embedded to firmly secure the same to the base, and said base having embedded therein a portion of a third pin a stub portion of which extends from said base into said chamber at the center of the base, and in which said substrate is secured to said base and has a central aperture through which said stub portion extends, and in which said connecting means includes said stub portion of said third pin, said stub portion providing a pivot for said rotatable means.

9. An adjustable resistor according to claim 1, in which said substrate is a ceramic insulation plate and said primary and auxiliary resistive devices are adherent first and second thin films, respectively, deposited on said substrate, said first film being of arcuate form disposed along an arc radially outward from a center of said plate and extending between said terminal means, and said second film being in direct contact with one electrical end of said first film and extending therefrom generally radially inwardly toward the center of said substrate.

References Cited

UNITED STATES PATENTS

| | | | |
|---|---|---|---|
| 2,202,840 | 6/1940 | Kramolin | 338—120 X |
| 2,463,384 | 3/1949 | Holmquist | 338—122 |
| 3,193,786 | 7/1965 | Moore, et al. | 338—175 X |
| 3,201,737 | 8/1965 | Mathison | 338—174 |
| 3,208,024 | 9/1965 | Enos et al. | 338—174 X |
| 3,242,450 | 3/1966 | Bourns et al. | 338—174 X |

FOREIGN PATENTS 1,298,703   12/1962   France.

ROBERT K. SCHAEFER, *Primary Examiner.*

H. J. HOHAUSER, *Assistant Examiner*